Patented Dec. 9, 1941

2,265,722

UNITED STATES PATENT OFFICE 2,265,722

PROCESS FOR TREATMENT OF HIGH MOLECULAR WEIGHT MULTIUNSATURATED POLYMERS OF DIENE HYDROCARBONS

Willem Leendert Johannes de Nie, Amsterdam, Netherlands, assignor to Shell Development Company, San Francisco, Calif., a corporation of Delaware No Drawing. Application December 23, 1939, Serial No. 310,760. In Great Britain December 19, 1938

13 Claims. (Cl. 260—93)

The invention relates to a process for the production of valuable products in which high-molecular multi-unsaturated substances are reacted with inorganic acid anhydrides, of which, in case the acid-forming elements occur in several stages of valency, those in which these elements are present in the highest stage of valency are excluded.

The process according to the invention is characterized by the fact that the process is carried out in the presence of aliphatic, cyclic or aliphatic-cyclic compounds containing one or more ether-like bound oxygen atoms, or isomeric forms of such compounds.

The products obtained according to the process of the invention, which products may be of a widely varying nature, may be used for various applications.

Some of them can be given a special form during their production, which form they retain even after their preparation. Thus, it is possible to produce certain reaction products in the form of threads, ribbons, films and layers applied on various kinds of materials (textures, wood, stone and the like), whilst other reaction products, which, for their application, are not bound to any special form may be used, for example, in the lacquer industry.

By high-molecular substances are meant those substances which have a molecular weight of at least about 5000.

High-molecular multi-unsaturated substances are, for example, polymerisation products of butadiene and its homologues and derivatives; further polymers of mixtures of these substances and polymers with other unsaturated organic substances.

The following are examples of polymers of homologues and derivatives of butadiene: methyl butadiene polymers, dimethyl butadiene polymers, pentadiene polymers and cholorprene polymers.

Co-polymers may be formed together with olefines, such as iso-butene, further with vinyl compounds, such as styrene, vinyl chloride, vinyl esters, acrylic acid, methacrylic acid, and with unsaturated aldehydes, ketones and ethers, such as acroleine, methyl isopropenyl ketone and vinyl ethyl ether.

Examples of other high-molecular multi-unsaturated substances are polymers of acetylene hydrocarbons and their derivatives, e. g. mono and di-vinyl acetylene polymers.

Other substances coming into consideration are co-polymers of acetylene hydrocarbons (or derivatives thereof) and butadiene hydrocarbons (or derivatives thereof), e. g. co-polymers of vinyl acetylene and butadiene; further, natural rubber and derivatives thereof, either combined with other high-polymers or not.

In addition to the above-mentioned high-polymer substances other substances may also be present, which may e. g. serve as plasticisers, fillers, dyestuffs, substances reducing the inflammability, and the like.

The following inorganic acid anhydrides which may be used in the process are given as examples: $SO_2$, $P_2O_3$ and $N_2O_3$. Of course, mixtures of these anhydrides may also be applied while in addition substances inert to the reaction may be present. If the acid-forming elements may occur in several stages of valency, those acid anhydrides in which the said elements are present in the highest stage of valency are excluded. Thus, $SO_3$, $P_2O_5$ and $N_2O_5$ as well as the corresponding acids $H_2SO_4$, $P_3PO_4$ and $HNO_3$ do not come into consideration.

It is known to treat butadiene polymers at ordinary or elevated temperatures with $SO_2$. This treatment may be effected in the presence of solvents for butadiene polymers, for which purpose low-boiling gasoline, benzene and carbon disulphide have been proposed.

These reactions, however, proceed very slowly, so that for practical purposes they hardly come into consideration. Thus, many hours are required before any appreciable quantity of $SO_2$ has been taken up. It is true that working under increased pressure promotes the conversion, but not to such an extent as to produce a smooth conversion.

If, according to the invention, the conversion takes place in the presence of an aliphatic, cyclic or aliphatic-cyclic compound containing one or more ether-like bound oxygen atoms, or an isomeric form of such a compound, the reaction is appreciably accelerated, so that, when operating at normal temperature and under normal pressure, within a short time a larger quantity of the inorganic component may often be taken up by the high-molecular multi-unsaturated substances than would otherwise be the case. Sometimes a quantity of acid or acid anhydride sufficient for a given application is bound in only a fraction of a second.

By a compound containing an ether-like bound oxygen atom, reference is made to organic compounds containing at least one oxygen atom which is linked directly by single bonds to carbon atoms, said carbon atoms being linked directly to only hydrogen atoms or carbon atoms, or by single bonds to oxygen atoms.

The substances with ether-like bound oxygen atoms have an accelerating effect on the reaction, which effect may sometimes be enhanced by the presence of activating agents, such as certain metal salts, e. g. ferro sulphate, ferri chloride, copper sulphate and manganese sulphate.

Examples of substances with ether-like bound oxygen atoms are: di-ethyl ether, di-isopropyl ether, vinyl ethyl ether, pentamethylene oxide, methyl propene methylene dioxide, ethene methylene dioxide, paraldehyde, dioxane and di-ethyl acetal.

Very favourable results are obtained by the use of dioxane, di-isopropyl ether and di-ethyl acetal.

In the present invention mesityl oxide is to be considered as an isomeric form of a substance with an ether-like bound oxygen atom.

Dependent on the nature and the quantities of the reacting components, the reaction temperature applied and the pressure, products of various kinds may be obtained. Other variations in carrying out the process may also have a considerable influence.

The high-molecular substance may, for instance, be caused to react either dissolved in a suitable solvent or not. The solvent for the high-molecular substance may be a mixture of several solvents, whilst compounds with one or more ether-like bound oxygen atoms may be among the components of such a mixture. The solvent may even consist completely of one or more compounds with ether-like bound oxygen atoms.

The acid anhydrides—likewise according to their nature—may be applied in the gaseous, liquid or dissolved state. The solvents that may be used for this purpose may also consist wholly or partly of compounds with ether-like bound oxygen atoms.

Further, the solvents may or may not affect the high-molecular substances. Thus, they may be solvents or swelling agents or coagulation agents for the high-molecular substances.

If, for example, butadiene polymer is dissolved in dioxane, it may be treated with $SO_2$ in the gaseous, liquid or dissolved state.

If gaseous $SO_2$ is used, the butadiene solution may be injected into it in the form of threads, ribbons or films or the $SO_2$ may be caused to react on a butadiene polymer applied on a surface, e. g. on a texture, provided care is taken that the polymer still contains dioxane, or some other solvent with an ether-like bound oxygen atom.

If gaseous $SO_2$ is caused to react on butadiene polymer dissolved in dioxane, the reaction may be carried out in the preesnce of e. g. benzene, such with a view to preventing the less soluble reaction product forming too quickly. To this end the $SO_2$ is caused to react with a dioxane solution of the polymer diluted with benzene.

If liquid $SO_2$ is used, it should be borne in mind that dioxane becomes solid at about 10–11° C., so that the presence of a substance lowering the melting point, e. g. paraldehyde or isopropyl alcohol, is desirable.

If $SO_2$ solutions are caused to react with solutions of butadiene polymers, either highly viscous or gelatinized products are otbained, depeadent on the concentrations and the nature of the solutions. A product of quite a different nature is obtained if the $SO_2$ is dissolved in a substance in which the butadiene polymer is insoluble or soluble in a slight extent only.

The following examples illustrate how the process of the invention may be carried into effect:

Example 1

A butadiene polymer solution in benzene of 12% concentration was used as initial material.

Upon a current of $SO_2$-gas being passed for some minutes through the solution no effect was observed.

A quantity of 50 cm.³ of the $SO_2$-containing solution was diluted with 75 cm.³ dioxane. After some hours the original solution had been converted into a gelatinous mass.

Example 2

50 cm.³ dioxane, in which 0.185 g. $SO_2$ had been dissolved, were added to 25 cm.³ of a 8.5% butadiene polymer solution (molecular weight abt. 60000) in dioxane. The solution gelatinized after about three minutes; the dried product was a tough light yellow film; the sulphur content amounted to 2.8%.

By way of comparison 25 cm.³ of the butadiene polymer solution in dioxane were diluted again with 25 cm.³ dioxane, but this time the dioxane added contained about 9 g. $SO_2$. The contents of the flask gelatinized directly after the mixing to a white untransparent product.

A brittle yellow powder with a sulphur content = 20.2% was obtained.

Example 3

15 g. plasticized rubber were dissolved in 150 g. benzene; an excess of $SO_2$ gas was passed through the filtered solution. After a contact time of 48 hours an increase of the viscosity was perceived.

15 g. plasticized rubber were dissolved in a mixture of 50 g. benzene and 100 g. dioxane; for three minutes a moderately rapid current of $SO_2$-gas was passed through the filtered solution. Four minutes after the discontinuation of the gas-current the liquid was converted into a solid gel, which very soon expelled liquid.

Example 4

5 g. polymer of divinyl acetylene were dissolved in 10 cm.³ dioxane, and a moderately rapid current of $SO_2$-gas was passed through this solution for ten minutes. The solution was then vaporized in vacuo at room temperature and a fine film with a sulphur content of 4.0% was thus obtained.

5 g. of the same polymer of divinyl acetylene were dissolved in 10 cm.³ toluene, and $SO_2$ was passed through this solution as well. The liquid became turbid and gelatinized after about 10 minutes. After drying in vacuo at room temperature a granular product was obtained; sulphur content: 4.6%.

Example 5

A mixture of gaseous $NO+NO_2(1:1)$ was passed through 25 cm.³ of a butadiene polymer solution of 7% concentration in dioxane; the solution gelatinized after some minutes; the dried product contained 2.3% nitrogen.

Starting from a butadiene polymer solution of 7% concentration in a mixture of di-isopropyl ether and benzene (1:1) a product with 1.1% nitrogen was obtained. When methyl propene methylene dioxide and ethene methylene dioxide were used as solvents, products with 1.4% and 1.6% nitrogen were obtained.

A product with 4.2% nitrogen could be obtained by passing the mixture through a butadiene polymer solution in dioxane and di-isopropyl ether (1:1).

Example 6

The same dioxane solution of butadiene polymer as was used in Example 5 was spun through a spinning nozzle in a downward direction into a vertical tube filled with ethyl alcohol, saturated with sulphur dioxide at a temperature of 11° C. During the coagulation the threads were stretched. The spinning rate at the nozzle amounted to about 8 metres per minute and at the lower end of the tube could be increased even to 120 metres per minute. The threads obtained in this manner could be wound on to a spool with an even greater velocity, viz. of about 160 metres per minute. The sulphur content of the resulting threads was found to be 1.46%.

Example 7

A butadiene polymer solution of 7.1% concentration was injected into a coagulation bath consisting of:

|  | Per cent |
|---|---|
| $BF_3$ | 6.7 |
| $CH_3COOH$ | 54.0 |
| $SO_2$ | 39.3 |
| Spinning temperature | Approx. 12° C. |
| Spinning direction | Upwards |
| Spinning velocity | 10 m/min. |
| Drawing-off velocity of the threads | Approx. 35 m/min. |
| Number of elementary threads | 20 |

After the threads had been washed and dried their sulphur-content was determined and found to be 8.0%.

Example 8

A butadiene polymer solution of 5.6% concentration in a mixture of dioxane and paraldehyde (1:1) was injected into liquid $SO_2$ at −15° C.

The spinning velocity amounted to about 10 m/min.

The coagulation velocity was considerable; threads with favourable properties were produced.

The sulphur content of the threads, after being washed and dried, was 4.8%.

Example 9

In a vertical spinning tube filled with a sulphur dioxide atmosphere and maintained at a temperature of about 60° C. a spinning solution of butadiene polymer in dioxane was injected through a spinning nozzle having a diameter of 0.20 mm. provided at the top of the tube. The solution had a concentration of 7.1%, a specific gravity (20/4) of 1.022 and a viscosity at 20° C. of 6.9 poises. The spinning velocity was about 10 metres per minute. Immediately after leaving the nozzle the liquid threads gelatinized and the coagulated threads could be drawn off continuously at the bottom of the spinning tube. The threads formed had a high tensile strength and their sulphur content amounted to 3.8%.

Example 10

On to a strip of silk gauze was poured a butadiene polymer solution in dioxane and over the liquid film was passed a mixture of $CO_2$ gas and $SO_2$-gas. The reaction with $SO_2$ took place during the simultaneous evaporation of the solvent. There remained on the silk a homogeneous gas-tight layer.

The sulphur content of the product depends on the testing conditions (mainly on the ratio of $CO_2$–$SO_2$); the registered values ranged between 2% and 14%.

Example 11

Linen was boiled in dioxane during one hour and was then immersed in a butadiene-polymer solution in dioxane of 4% concentration, which solution still contained 0.2% Igepon T (a wetting-agent).

The immersed material was successively pressed between two rollers and passed into a bath of the following composition:

|  | Parts |
|---|---|
| $CH_3OH$ | 80 |
| $H_2O$ | 20 |
| $SO_2$ | 90 |

After a contact time of three minutes the material was washed in another bath free of $SO_2$ and then dried.

The crease-stability of the linen was considerably enhanced by the treatment.

I claim as my invention:

1. A process for the production of valuable products which comprises reacting a high-molecular weight multi-unsaturated polymer of a diene hydrocarbon with an inorganic acid anhydride selected from the group consisting of sulfur dioxide, phosphorus trioxide and nitrogen trioxide, said reaction being conducted in the presence of a compound selected from the group consisting of di-ethyl ether, di-isopropyl ether, vinyl ethyl ether, pentamethylene oxide, methyl propene methylene dioxide, ethene methylene dioxide, paraldehyde, dioxane and di-ethyl acetal.

2. A process for the production of valuable products which comprises reacting a high-molecular weight multi-unsaturated polymer of a diene hydrocarbon with an inorganic acid anhydride selected from the group consisting of sulfur dioxide, phosphorus trioxide and nitrogen trioxide, said reaction being conducted in the presence of di-ethyl acetal.

3. A process for the production of valuable products which comprises reacting a high-molecular weight multi-unsaturated polymer of a diene hydrocarbon with an inorganic acid anhydride selected from the group consisting of sulfur dioxide, phosphorus trioxide and nitrogen trioxide, said reaction being conducted in the presence of dioxane.

4. A process for the production of valuable products which comprises reacting a high-molecular weight multi-unsaturated polymer of a diene hydrocarbon with sulfur dioxide, said reaction being conducted in the presence of dioxane.

5. A process for the production of valuable products which comprises reacting a high-molecular weight multi-unsaturated polymer of a diene hydrocarbon with sulfur dioxide, said reaction being conducted in the presence of a compound selected from the group consisting of di-ethyl ether, di-isopropyl ether, vinyl ethyl ether, pentamethylene oxide, methyl propene methylene dioxide, ethene methylene dioxide, paraldehyde, dioxane and di-ethyl acetal.

6. A process for the production of valuable products which comprises reacting a high-molecular weight multi-unsaturated polymer of a diene hydrocarbon with sulfur dioxide, said reaction being conducted in the presence of di-ethyl acetal.

7. A process for the production of valuable products which comprises reacting a high-molecular weight multi-unsaturated polymer of butadiene with an inorganic acid anhydride selected from the group consisting of sulfur dioxide, phosphorus trioxide and nitrogen trioxide, said reaction being conducted in the presence of dioxane.

8. A process for the production of valuable products which comprises reacting a high-molecular weight multi-unsaturated polymer of butadiene with an inorganic acid anhydride selected from the group consisting of sulfur dioxide, phosphorus trioxide and nitrogen trioxide, said reaction being conducted in the presence of a compound selected from the group consisting of di-ethyl ether, di-isopropyl ether, vinyl ethyl ether, pentamethylene oxide, methyl propene methylene dioxide, ethene methylene dioxide, paraldehyde, dioxane and di-ethyl acetal.

9. A process for the production of valuable products which comprises reacting a high-molecular weight multi-unsaturated polymer of butadiene with sulfur dioxide, said reaction being conducted in the presence of di-ethyl acetal.

10. A process for the production of valuable products which comprises reacting a high-molecular weight multi-unsaturated polymer of butadiene with sulfur dioxide, said reaction being conducted in the presence of dioxane.

11. A process for the production of valuable products which comprises treating a high molecular weight multi-unsaturated polymer of a diene hydrocarbon with a gaseous inorganic acid anhydride selected from the group consisting of sulfur dioxide, phosphorus trioxide and nitrogen trioxide, said treatment being conducted in the presence of a compound selected from the group consisting of di-ethyl ether, di-isopropyl ether, vinyl ethyl ether, pentamethylene oxide, methyl propene methylene dioxide, ethene methylene dioxide, paraldehyde, dioxane and di-ethyl acetal.

12. A process for the production of valuable products which comprises treating a high-molecular weight multi-unsaturated polymer of a diene hydrocarbon with gaseous sulfur dioxide, said treatment being conducted in the presence of a compound selected from the group consisting of di-ethyl ether, di-isopropyl ether, vinyl ethyl ether, pentamethylene oxide, methyl propene methylene dioxide, ethene methylene dioxide, paraldehyde, dioxane and di-ethyl acetal.

13. A process for the production of valuable products which comprises reacting a high-molecular weight multi-unsaturated polymer of butadiene with gaseous sulfur dioxide in the presence of dioxane.

WILLEM LEENDERT JOHANNES DE NIE.